UNITED STATES PATENT OFFICE.

CHARLES H. ROBERTS, OF LLOYD, NEW YORK.

PRESERVING FORAGE BY STORAGE IN SILOS.

SPECIFICATION forming part of Letters Patent No. 254,695, dated March 7, 1882.

Application filed January 27, 1882. (No specimens.)

*To all whom it may concern:*

Be it known that I, CHARLES H. ROBERTS, of Lloyd, in the county of Ulster and State of New York, have invented a new and useful Improvement in Preserving Forage by Storage in Silos, of which the following is a full, clear, and exact description.

This invention relates to certain new and useful improvements in preserving forage—such as dry cornstalks—by storage in silos.

The invention consists in moistening, wetting, or saturating the dry or partly dried stalks and plants—such as cornstalks—before or after they are placed in the silo, and they are then packed and compressed in the silo in this moistened state.

In carrying out my invention, the dry or partially dried cornstalks from which the corn has been husked, are cut into pieces of about three-eighths of an inch in length, or longer or shorter, as may be desired; but the stalks should always be cut as finely as possible. In place of cutting the stalks, they may be mashed or broken by rollers or other suitable devices, or may be reduced to small pieces in any other suitable manner. These finely cut or reduced cornstalks are to be packed in a silo. Before or after cutting the stalks, or before or after being packed in the silo, these finely-reduced cornstalks are sprinkled, moistened, wetted, or saturated with water or steam, or each layer is wetted or moistened in the silo. The cornstalks are packed and compressed in the silo in this wet or moistened state. It is desirable to get all the water into the stalks that they will absorb and retain after compression by the usual methods of compression of ensilage in silos. The object to be obtained by moistening or saturating the cornstalks with water is to restore to them about the amount of water the stalk, leaves, and husks have lost in maturing or by drying before or after being cut. The water absorbed by the cornstalks renders them soft and succulent, and adapted to be used as forage and packed in a silo. The results obtained with this forage have been highly satisfactory in every respect. This dry cornstalk forage can be stored in the same silo with the green ensilage, for the green corn (ensilage) is packed into the silo early in the season, and settles one-fourth to one-third of the entire depth. The dry cornstalks are taken from the fields after husking—that is, later in the season, and the silo is refilled with the forage prepared from the cornstalks after husking the corn, as above set forth; or the silo can be filled completely with the forage made in the manner set forth from the cornstalks after husking the corn. The silo is then covered and weighted down in the usual way. The essential feature of this invention is supplying the dry or partly dried cornstalks with the moisture they lost by maturing or evaporation by drying before or after being cut, so as to make them tender and succulent and adapt them to be packed in a silo. Dry or partly dried pea or bean vines or like plants can be treated in the same manner for storage as fodder.

Having thus described my invention, I claim as new and desire to secure by Letters Patent—

The method, substantially as herein shown and described, of preserving dry or partly dried cornstalks for forage, consisting in wetting the stalks with water or steam before or after they are placed in the silo, and compressing and packing them in the silo in this wet or moistened state, as set forth.

CHARLES H. ROBERTS.

Witnesses:
OSCAR F. GUNZ,
C. SEDGWICK.